United States Patent
Elgersma et al.

(10) Patent No.: US 8,275,205 B2
(45) Date of Patent: Sep. 25, 2012

(54) PRIORITIZER SYSTEM FOR TARGET ACQUISITION

(75) Inventors: Michael Ray Elgersma, Plymouth, MN (US); Saad J. Bedros, West St. Paul, MN (US); Michael Janssen, Minneapolis, MN (US); Ben Miller, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 532 days.

(21) Appl. No.: 12/495,557

(22) Filed: Jul. 23, 2009

(65) Prior Publication Data

US 2011/0019924 A1    Jan. 27, 2011

(51) Int. Cl.
*G06K 9/62* (2006.01)
*H04N 5/225* (2006.01)

(52) U.S. Cl. ..................... 382/209; 348/169
(58) Field of Classification Search .................. 382/103, 382/118, 209, 236; 348/137, 169–172, 208.14, 348/329, 331, 94, 208.16, 267; 342/29, 36, 342/64; 710/40, 44, 111, 114, 115, 116, 710/121, 122, 123; 711/158

See application file for complete search history.

(56) References Cited

U.S. PATENT DOCUMENTS

| | | | |
|---|---|---|---|
| 5,208,591 A * | 5/1993 | Ybarra et al. | 340/961 |
| 5,341,142 A * | 8/1994 | Reis et al. | 342/64 |
| 6,983,198 B2 | 1/2006 | Weiner | |
| 2008/0075334 A1 * | 3/2008 | Determan et al. | 382/117 |

* cited by examiner

*Primary Examiner* — Abolfazl Tabatabai
(74) *Attorney, Agent, or Firm* — Seager Tufte & Wickhem LLC (57) ABSTRACT

A system having an approach for prioritizing targets for an order of capturing the targets photographically or otherwise. Prioritizing is based on cost of obtaining or capturing the target for viewing or photographing in high resolution. One acquisition mechanism is for obtaining a wide field of view of a scene of targets and another acquisition mechanism is for obtaining a narrow field of view of a target for capture. The cost for prioritizing is based on the time that the narrow field of view acquisition mechanism takes to pan and tilt to get a close-up image of a target divided by the width of the target. The targets may be faces of people.

19 Claims, 13 Drawing Sheets

PRIORITIZER SYSTEM FOR TARGET ACQUISITION

The U.S. Government may have certain rights in the present invention.

BACKGROUND

The invention pertains to image acquisition and particularly to such acquisition of people. More particularly, the invention pertains to an ordered acquisition of numerous faces of people.

SUMMARY

The invention is a target system for prioritized face photographic or video acquisition for close-up viewing, recording, tracking, and/or recognition.

DESCRIPTION

When a pan/tilt/zoom camera or acquisition mechanism needs to zoom in to take close-up images of multiple people walking past the camera or acquisition mechanism, an efficient method would be desirable for allowing the camera or acquisition mechanism to get a close-up image of as many people as possible, before the people pass out of view.

Figure 1:
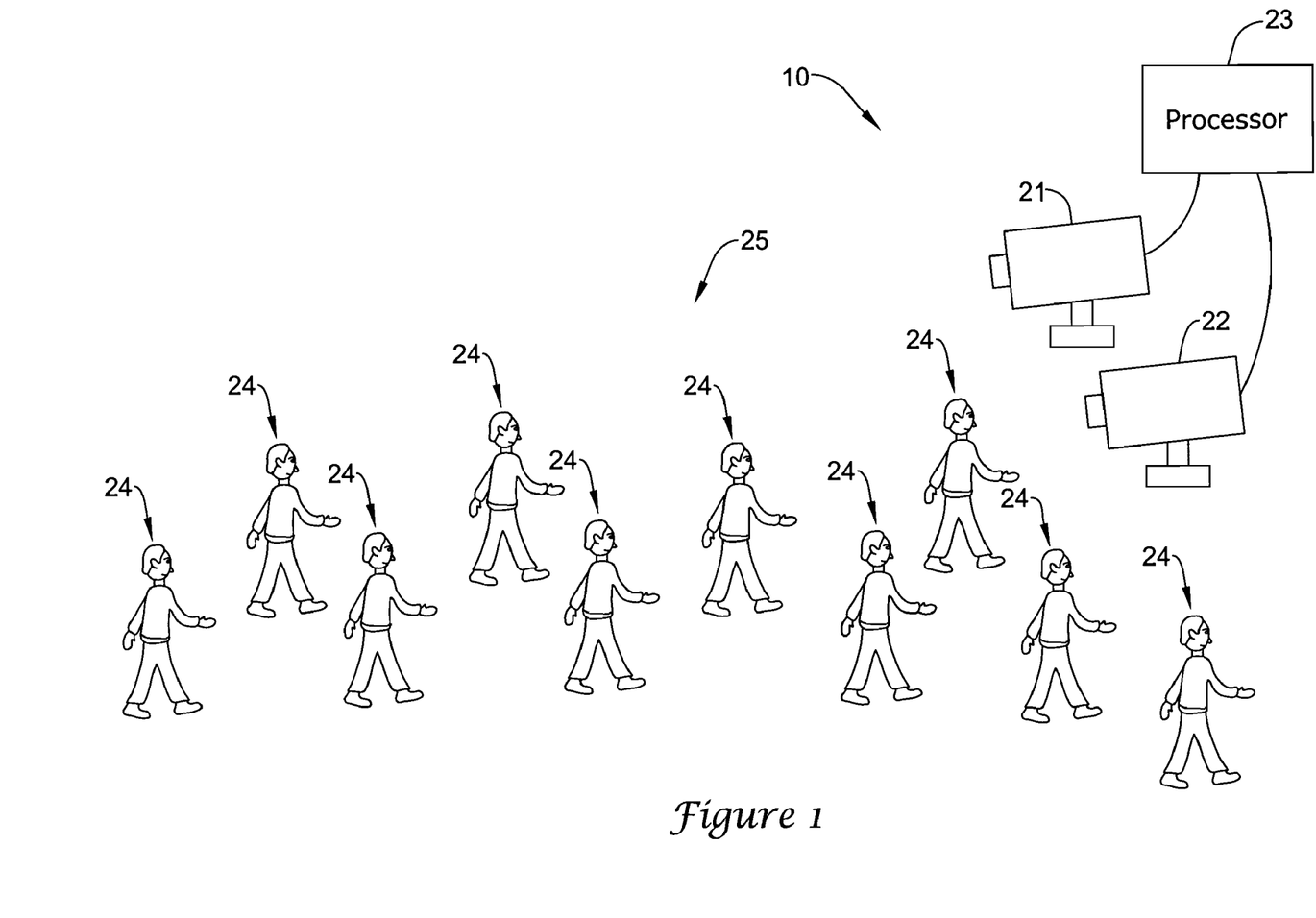
FIG. 1 is a diagram of a target prioritizer system.

FIG. 1 shows a basic layout of the target prioritizer system 10 for face tracking and acquisition (e.g., photographics). System 10 may include a wide field of view camera or acquisition mechanism 21 and a narrow field of view camera or acquisition mechanism 22 connected to a processor 23. Cameras 21 and 22 may be video or another kind of cameras or image acquisition devices or mechanisms. Cameras 21 and 22 may be directed to people 25 having faces 24. Camera 22 may be a three-dimensional (3D) laser scanning mechanism or other kind of mechanism or camera. Camera 21 may be a red-green-blue (i.e., color), black-white, gray-scale, an infrared camera, or other kind mechanism. As illustrative example, a camera or cameras may be referred to in the description herein.

System 10 may make a prioritized list of which face 24 should be acquired first, so as to get as many faces 24 acquired as possible before they pass out of the camera's field of view. An algorithm, situated in processor 23, may use the current and predicted position and velocity of each face 24, and the position and pan/tilt speed of the camera 22 to determine the time t(i) needed to pan/tilt and zoom the camera 22 to each face. As faces 24 move towards cameras 21 and 22, the faces get larger in the image and eventually leave the image. The width or size of the face in the image is correlated to the distance of the face from the acquisition mechanism or camera. The main cost associated with face (i) is cost (i)=t(i)/F (width(face(i))), where F( ) is a mathematical function. Less pan/tilt time and a larger face leads to less cost. Thus, the face 24 with the lowest cost may be the first face that will be acquired. Other factors such as a number of good "quality" images already taken of that face 24, face pose, lighting, and so on, may also be taken into account.

A wide field of view (WFOV) camera 21 with fixed position, orientation and zoom may be used to get an overall picture of what faces 24 are available. Software in a processor 23 may then determine pixel coordinates of the center of each face 24 in the WFOV image. By tracking these low-resolution faces 24 in the WFOV image, velocities of the face centers may be determined in pixel coordinates. This information may be passed to the target prioritizer algorithm in the processor, which then determines where to point the narrow field of view (NFOV) pan tilt zoom (PTZ) camera 22 to capture close-up high or standard resolution photos of as many of the faces 24 as possible.

Figure 2:
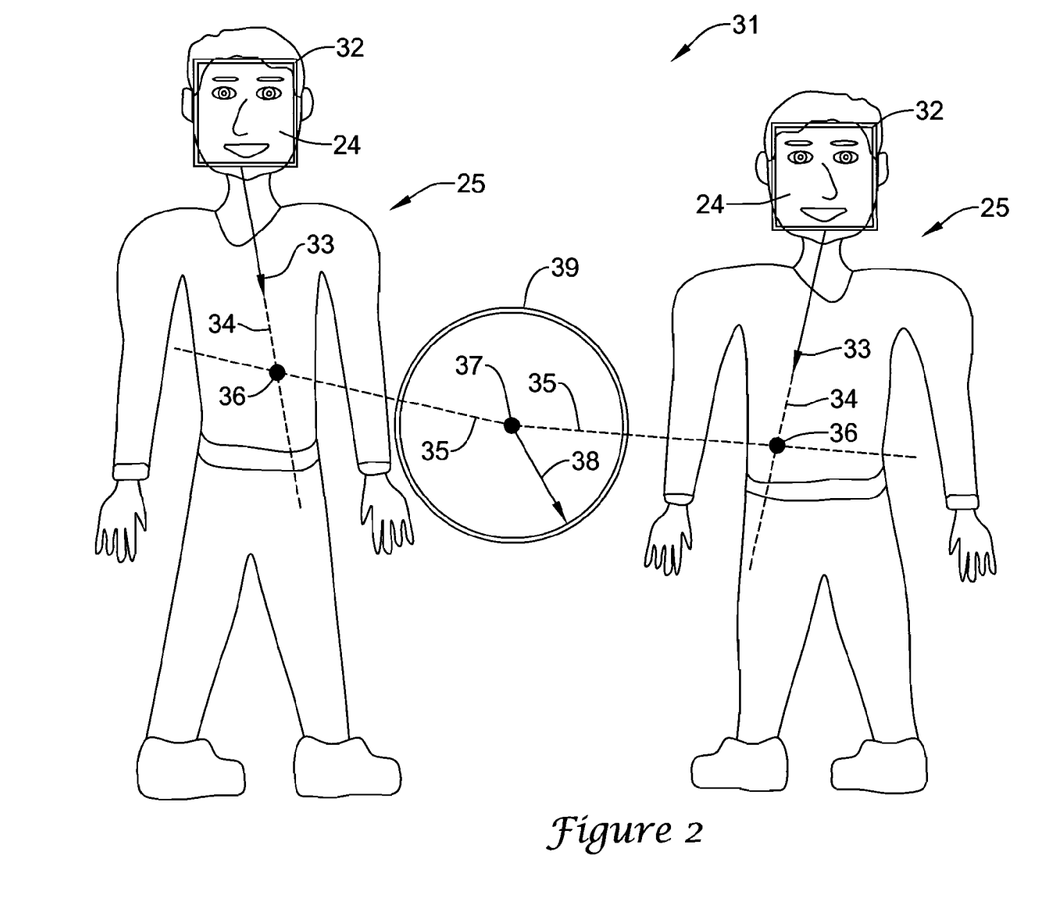
FIG. 2 is a diagram of a wide field of view image showing several people having selected faces for acquisition.

FIG. 2 is a diagram of view 31 of a wide field of view camera 21 image showing several people. Their faces 24 may be selected with rectangular frames 32 upon where the velocities are measured and indicated by vectors 33. The subject positions and velocity direction may be indicated by lines 34. Intersections 36 of lines 34 with lines 35 from PTZ camera 22 may indicate positions of the subject 25 relative to camera 22. Point 37 indicates the current position of camera 22. Line 38 may indicate the velocity of camera 22. Circle 39 indicates the maximum PTZ speed of camera 22. Which face 24 is to be captured photographically may depend on various factors including PTZ response times, camera 22 position, velocities and position of subjects 25, subject 25 ranges, face sizes, and poses and lighting of the faces 24 of the subjects. These factors may be accounted for by the target prioritizer which determines the best order of the sequence of faces upon which camera 22 is to zoom in on and obtain close-up high or standard resolution images of faces 24.

Given the task of obtaining close-up images of people 25 walking in some region, the task is divided between a wide-field-of-view (WFOV) camera 21 with fixed orientation and zoom, and a narrow-field-of-view (NFOV) pan-tilt-zoom (PTZ) camera 22 that obtains high or standard resolution images of each individual face 24. The WFOV camera 21 determines the general pixel location and direction of pixel motion of each face 24, then the target prioritizer assigns a rank or priority (from 1 to n, for n faces or targets). The NFOV camera pans, tilts and zooms in on the highest priority faces 24. After several images of the highest priority face 24 are accumulated, that face's priority decreases and another face 24 becomes highest priority, so the NFOV camera 22 then moves to that next face 24. The target prioritizer algorithm may rank the list of faces 24 seen in the WFOV image at every frame.

Selection of faces 24 on the move depends mainly on: 1) pan and tilt response times and current position; 2) subject velocity and position; 3) subject range, i.e., face size; and 4) face quality related to subject face pose and lighting.

Target prioritizer determination of pan/tilt control may be noted herein. The target-prioritizer algorithm uses the following input values for the determination.

$x_i \in R^2$ WFOV pixel position vectors for i=1 to n face (target) centers.

$v_i = \dot{x}_i \in R^2$ WFOV pixel velocity vectors for i=1 to n face centers.

$x_{PTZ} \in R^2$ The WFOV pixel position of the center of the NFOV PTZ image.

$\|v_{PTZ}\|$ Maximum WFOV pixel speed at which the NFOV PTZ camera 22 can pan and tilt.

The following output values may be calculated.

$v_{PTZ} = \dot{x}_{PTZ} \in R^2$ The WFOV pixel velocity of the center of the NFOV PTZ image.

$t_i$ Predicted intercept time of PTZ camera 22 with face$_i$.

$x(t_i) \in R^2$ Predicted intercept WFOV pixel position of NFOV PTZ camera 22 with face 24.

$cost_i \in R^2$ Cost associated with PTZ targeting face 24, for i=1 to n.

Priority A sequence of n integers, arranged according to face 24 priority ranking.

Figure 3:
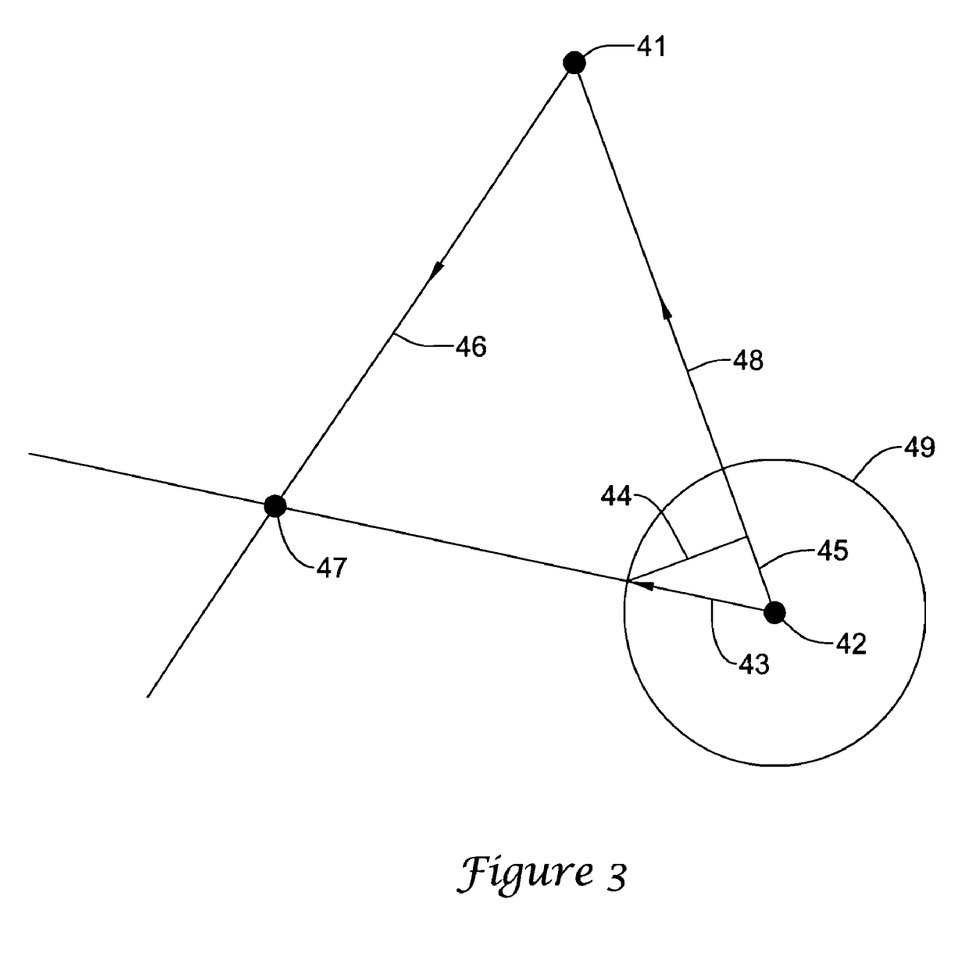
FIG. 3 is a diagram of intercepting paths of a acquisition mechanism and a target face for acquisition of the face by the acquisition mechanism.

Integer priority values for each face 24 are assigned such that faces 24 with lower cost have higher priority. Face images are generally only captured when people 25 are walking towards the camera, so WFOV face size will increase until a face 24 goes out of the image. So a higher priority is assigned to larger faces 24, so that the NFOV camera 22 can capture a high or standard resolution image before the face 24 goes out of the WFOV image. Cost is also a function of how long it will take for the NFOV PTZ camera 22 to pan/tilt to the next face 24. For any given face 24, the fastest way to pan/tilt to that face 24 is for the PTZ camera 22 to pan/tilt to the predicted intercept point, where the prediction is based on the current position and velocity of the face 24 in WFOV pixel coordinates, as well as on the current position and max speed of the PTZ camera 22. If face 24 and its predicted intercept point 47 (FIG. 3) are both in the WFOV image, the pose and illumination of the current face 24 are good, and the number of high-quality acquired images (i.e., standard or high resolution) of that face 24 is less than the required amount, then cost may be set equal to the intercept time divided by the function related to the face size; the function can be the actual face size, the square of the face size, or face width; otherwise cost would be set to infinity. The required amount of high-quality acquired images may be two images. A face of acceptable resolution (i.e., standard or high) should fill about one-half of the sensor array area of the narrow field of view camera 22. The sensor array of camera 22 may be about 640×480 pixels (i.e., VGA).

$$cost_i = \frac{t_i}{width(face_i)}$$

To determine the intercept point 47, the future position of face$_i$ at time $t_i$ is set equal to the future position of the PTZ camera 22 at time $t_i$.

$x(t_i) = x_i + v_i * t_i$ $x(t_i) = x_{PTZ} + v_{PTZ} * t_i$

Setting the right-hand sides of these two equations equal may give the following.

$x_i - x_{PTZ} = (v_{PTZ} - v_i) * t_i$      Equation 1

FIG. 3 is a diagram of an intercept of the PTZ camera 22 with the target face 24. The diagram is shown at a wide field of view perspective of camera 21. Face 24 may be shown as face$_i$ or target(i) at point 41, and a center of the PTZ field of view $X_{PTZ}$ at point 42. The PTZ speed $\|v_{PTZ}\|$ of vector 43 is known. However, the two orthogonal components b 44 and c 45 of vector $v_{PTZ}$ should be computed, such that $\|v_{PTZ}\|^2 = b^2 + c^2$. The intercept time $t_i$ may be eliminated from equation 1. Intercept start time may occur when face 24 is at point 41, which may be a face(i) center vector xi, that may move at a velocity vi, indicated by vector 46 towards an intercept point 47, which is indicated as x(t(i)). A unit vector w is indicated by vector 48. Circle 49 indicates the speed of the PTZ of camera 22. Intercept time $t_i$ may be eliminated from equation 1, then PTZ velocity vector $v_{PTZ}$ will be solved. Equation 1 shows that $x_i - x_{PTZ}$ and $v_{PTZ} - v_i$ should be in the same direction. J may be defined to be the 2×2 matrix that rotates vectors in $R^2$ by 90 degrees.

$$J = \begin{bmatrix} 0 & -1 \\ 1 & 0 \end{bmatrix}$$

rotates vectors in $R^2$ by 90 degrees.

Since $x_i - x_{PTZ}$ and $v_{PTZ} - v_i$ must be in the same direction, it follows that $v_{PTZ} - v_i$ has to be perpendicular to $J*(x_i - x_{PTZ})$.

$(v_{PTZ} - v_i)^T J*(x_i - x_{PTZ}) = 0$

Let a unit vector w be defined in the $x_i - x_{PTZ}$ direction as indicated in the following.

$$w = \frac{x_i - x_{PTZ}}{\|x_i - x_{PTZ}\|}$$

Then the previous equation can be written as, $(v_{PTZ} - v_i)^T (J*w) = 0$

Separating out the $v_{PTZ}$ and $v_i$ parts of this last equation may result in the following items.

$(v_{PTZ})^T (J*w) = (v_i)^T (J*w)$

Since $\|J*w\| = 1$, this gives the component b of $v_{PTZ}$ that is perpendicular to w.

$v_{PTZ} = b*(J*w) + c*w$ where $b = (v_{PTZ})^T (J*w) = (v_i)^T (J*w)$

The Pythagorean theorem may be used to get the component c of $v_{PTZ}$ that is parallel to w.

$c = \sqrt{\|v_{PTZ}\|^2 - b^2} = \sqrt{\|v_{PTZ}\|^2 - [(v_i)^T(J*w)]^2}$

Combining the expressions for b and c may give a formula for $v_{PTZ}$ in terms of $v_i$ and w.

$v_{PTZ} = [(v_i)^T(J*w)]*(J*w) + \sqrt{\|v_{PTZ}\|^2 - [(v_i)^T(J*w)]^2} *w$

The intercept time and intercept location may then be indicated by the following.

$$t_i = \frac{\|x_i - x_{PTZ}\|}{\|v_i - v_{PTZ}\|}$$

$x(t_i) = x_i + v_i * t_i$

Intercept times may be computed for each face 24, then those times and corresponding face widths are used in the cost function to determine priority for which face 24 the PTZ camera 22 will look at first.

$$cost_i = \frac{t_i}{width(face_i)}$$

Given the index i for the face 24 with the least cost, pan and tilt may be commanded using the value of $v_{PTZ}$ determined using the position and velocity of the face 24 with the lowest cost.

An optical zoom may be commanded so that the highest-priority face 24 takes up around half the width of the NFOV camera image. This is a compromise between wanting as many pixels as possible on the face 24, and wanting the face 24 to remain in the NFOV image while the person walks somewhat erratically. The zoom value can also be calculated as a function of the current zoom level of the WFOV camera, the current face size in the WFOV camera, the lens characteristics of the WFOV and NFOV cameras, and the desired face size for best capture. As the PTZ camera 22 pans and tilts to the highest priority face 24, its zoom control needs to be moving towards the zoom level that will be appropriate for the width of that face 24. On some cameras, the zoom cannot operate at the same time as the pan/tilt, and the zoom is often slower than the pan/tilt response. In this case, the pan/tilt should operate first to acquire the face 24; then as the zoom operates, the zoom should intermittently relinquish control to the pan/tilt, which will make small adjustments to keep tracking the face 24.

Robustness to target identification errors may be needed. The target prioritizer algorithm may rely on being given the location of each of the faces 24 in the WFOV camera image. If a face 24 moves erratically in the WFOV image, then the face identification number for that same face 24 may accidentally change intermittently. That could result in the system thinking that a new face 24 has appeared at the current PTZ location, and that face 24 would get high priority since cost would be low since the acquisition time is low. To prevent that problem, then the cost of all faces 24 in the vicinity of the current PTZ position should be increased as the number of acquired frames in that region gets above some threshold, such as two as an example.

Figure 4A:
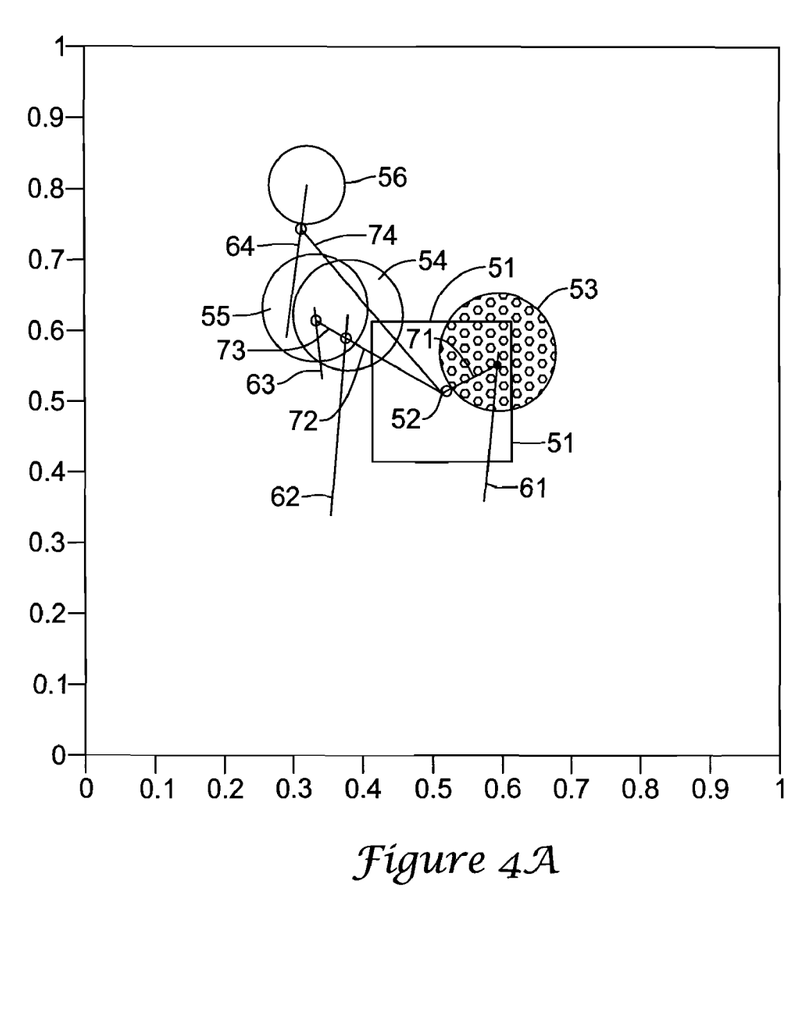
FIGS. 4a-4j are a sequence of diagrams showing a prioritized acquisition or capture of various faces with a geometrical representation.

FIGS. 4a-4j show a field of view 51 of the PTZ camera 22 as it moves in on the various faces 24 of people 25, for acquisition or capture of views, video or photographs of them in a prioritized order. Faces 24 will be relabeled in these Figures so as to distinguish the faces from one another for purposes of the sequence of FIGS. 4a-4j. Field of view 51 may have a PTZ center 52. The faces are represented by circles. The faces with dots have the least cost. The blank faces have higher costs. The faces with line marks have already been seen and/or captured photographically. In FIG. 4a, face 53 has the lowest cost. Thus the PTZ field of view 51 is moving towards face 53. Faces 54, 55 and 56 have higher costs. Lines 61, 62, 63 and 64 indicate velocities of faces 53, 54, 55 and 56, respectively. Lines 71, 72, 73 and 74 indicate paths from the PTZ field of view center 52 to faces 53, 54, 55 and 56, respectively.

Figure 4B:
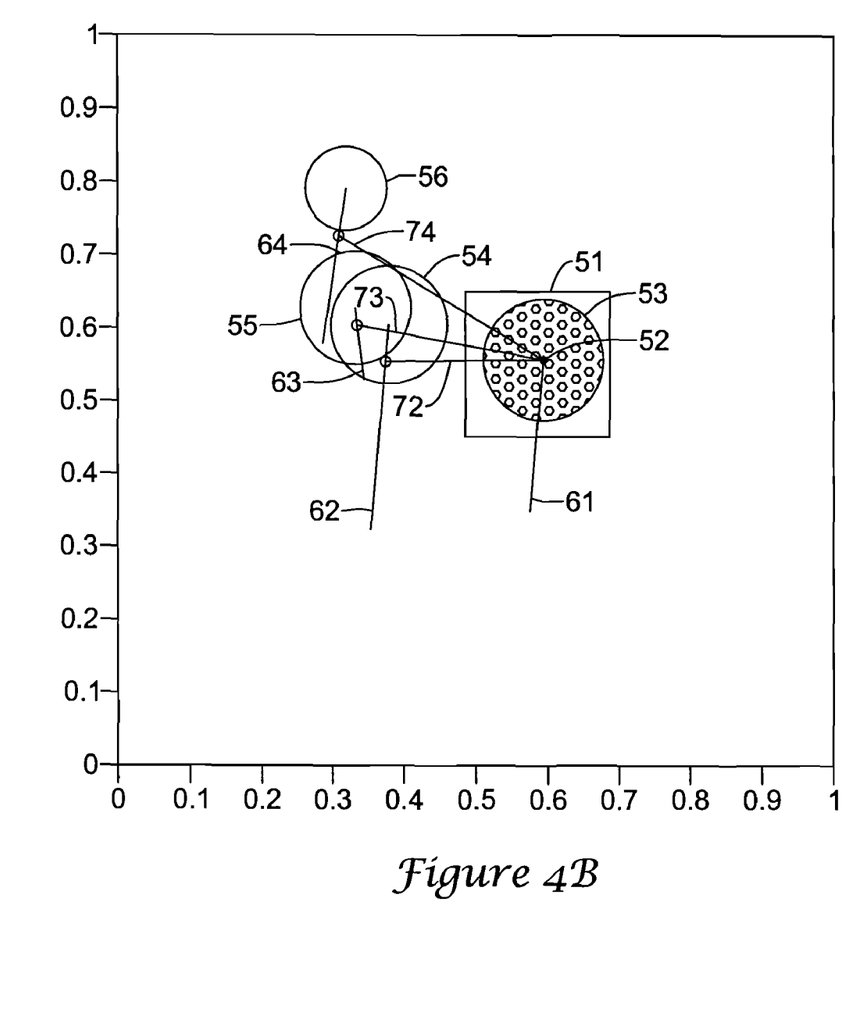
Figure 4C:
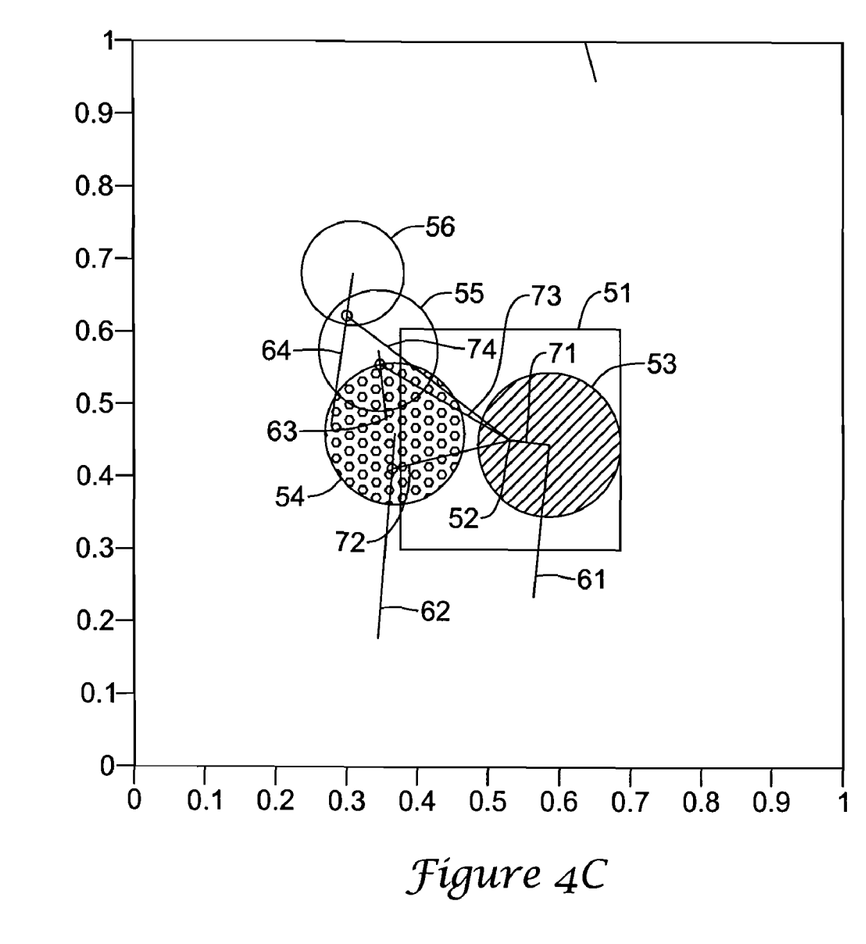
Figure 4D:
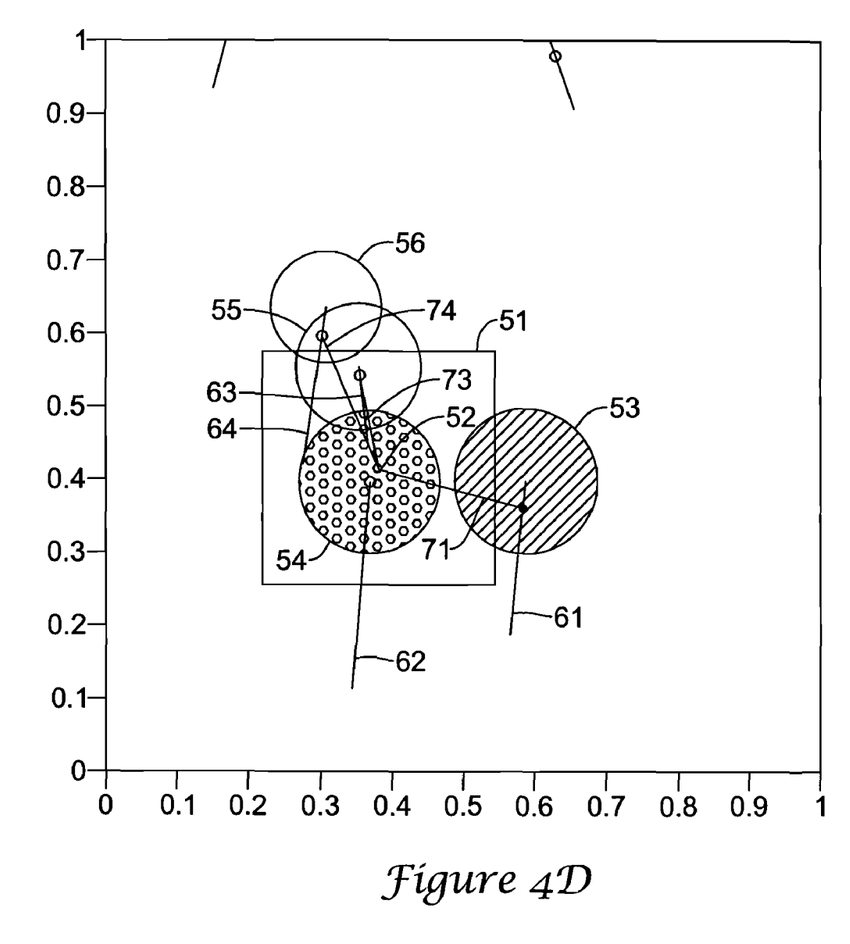

FIG. 4b shows field of view 51 having reached face 53. Face 53 may be acquired or captured photographically by camera 22. The faces selected to be acquired or captured may be just viewed rather than photographically captured or acquired. After the capture of face 53, face 53 is no longer in contention for selection as the least cost face which may be indicated by the dots switching to lines in FIG. 4c. Narrow field of view 51 begins to seek out the least cost face among faces 54, 55 and 56, since face 53 has already been seen. Face 54 becomes dotted indicating that it currently has the lowest cost. Thus, NFOV 51 moves toward face 54 for capture or acquisition as shown in FIGS. 4c and 4d. NFOV 51 may position its PTZ center 52 on the center of face 54. Face 54 may be photographed. The faces may typically be moving towards camera 22 as indicated by their downward movement and enlargement in size during the sequence of the Figures.

Figure 4E:
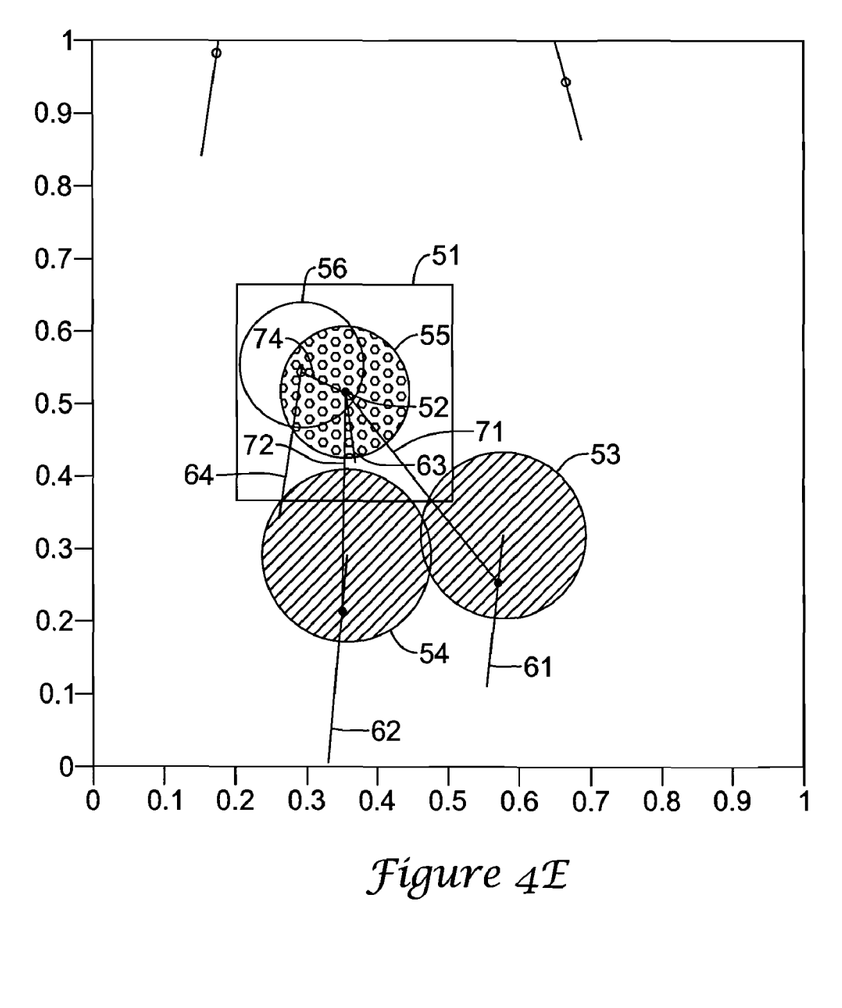
Figure 4F:
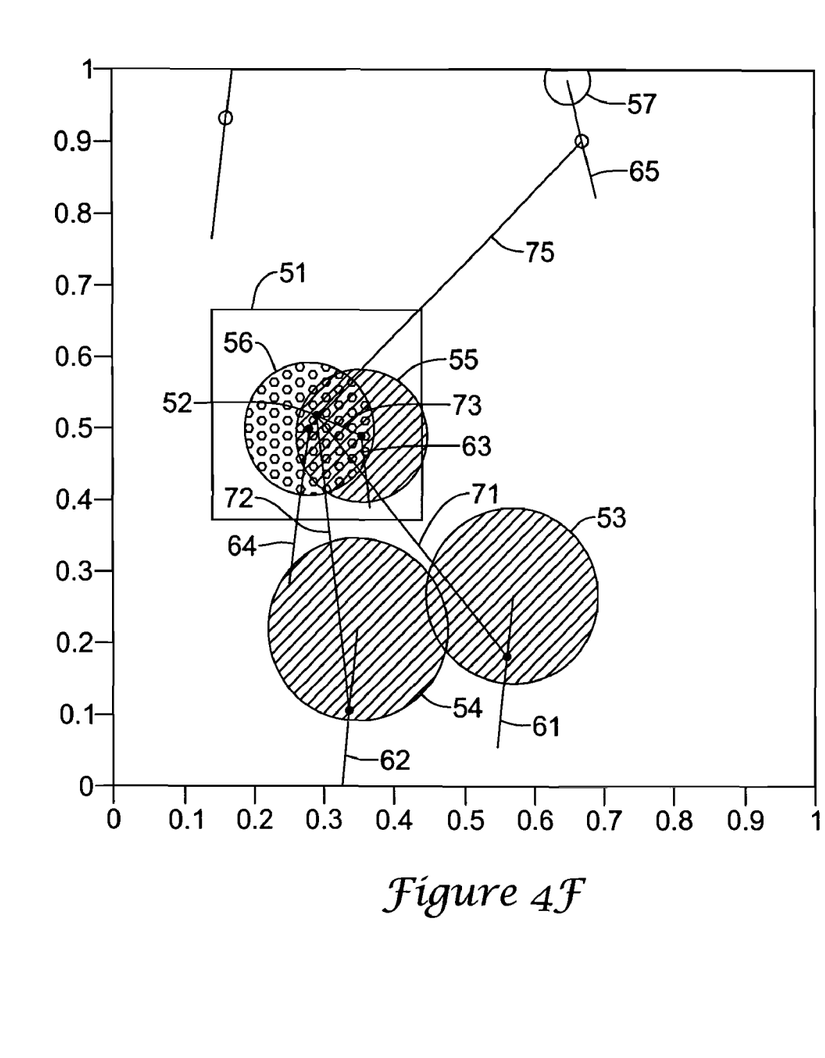

The NFOV 51 may seek out the next lowest cost face since faces 53 and 54 have been seen. FIG. 4e shows face 55 as being the lowest cost face not having been seen before. Thus, NFOV 51 has the PTZ center 52 which moves to the center of face 55 for photographic capture or other process. Face 54 may lose dots and gain a line pattern to indicate as having been viewed or captured. Face 55, upon being recognized as having the least cost, may be covered with dots. After capture of face 55, the next least cost face is identified as face 56, which is shown with dots, as shown by FIG. 4f. Center 52 of NFOV 51 may move to the center of face 56 for capture of that face. In the meantime, another face 57 emerges with its velocity indicator line 65 and the PTZ intercept path 75.

Figure 4G:
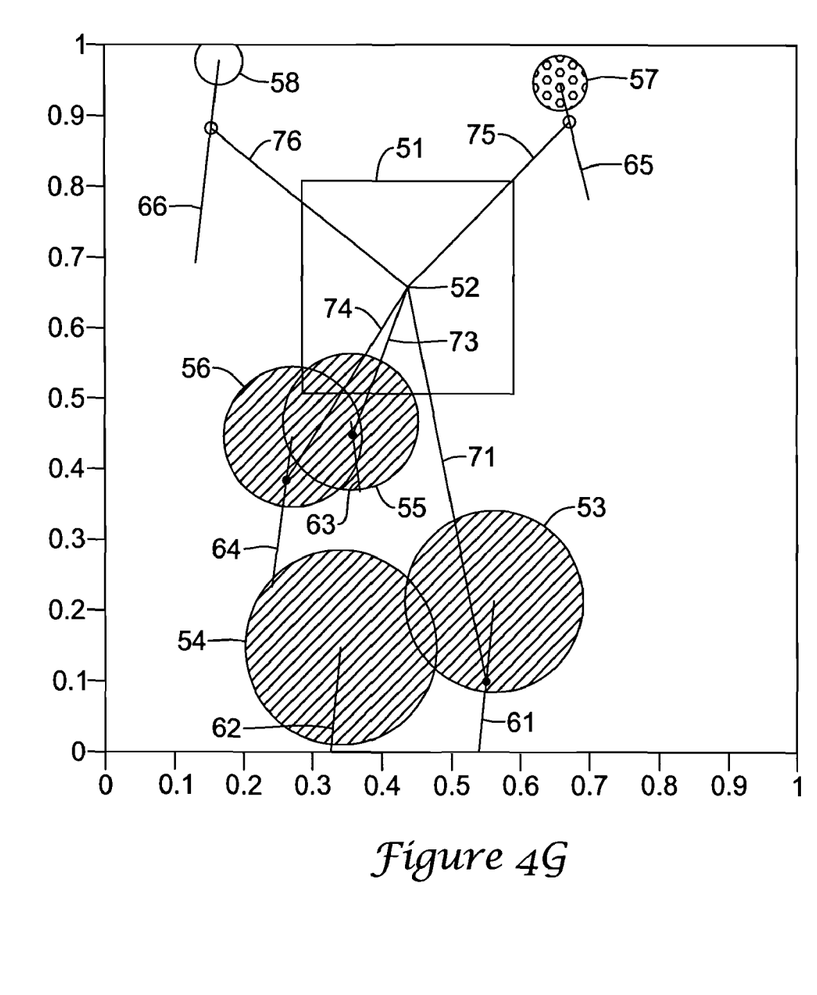
Figure 4H:
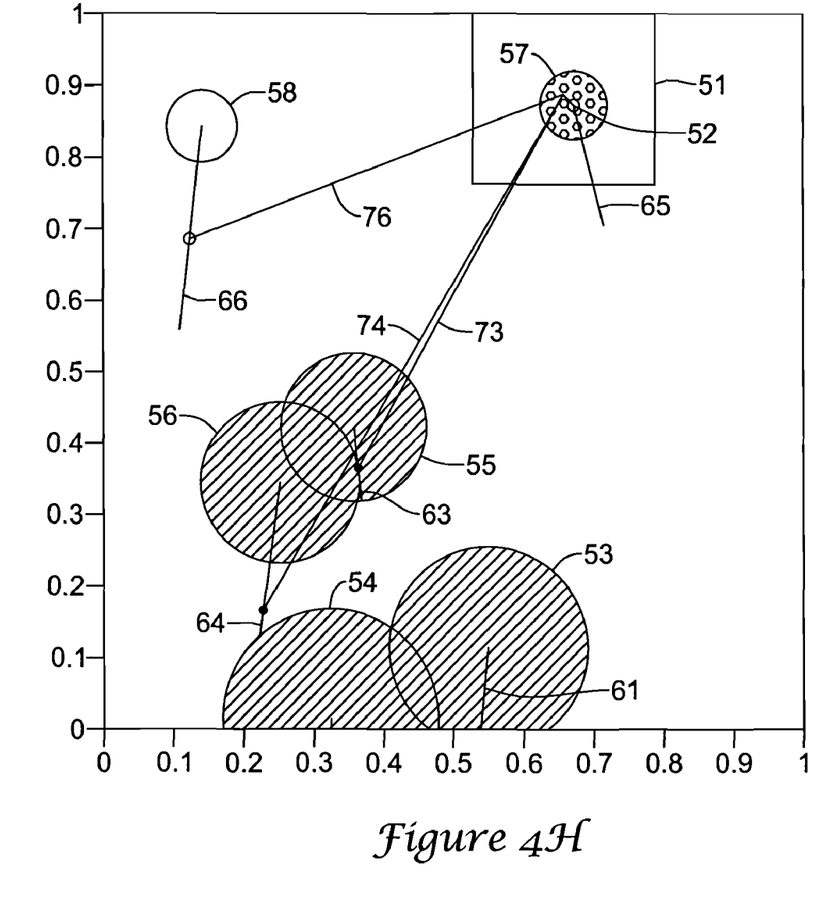
Figure 4I:
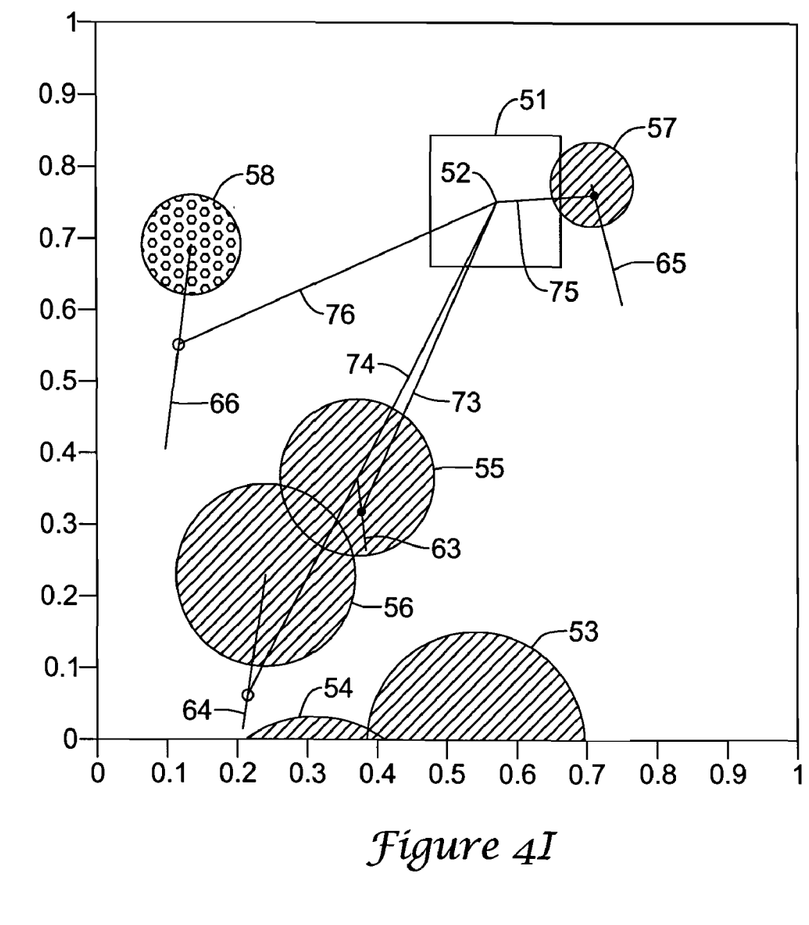
Figure 4J:
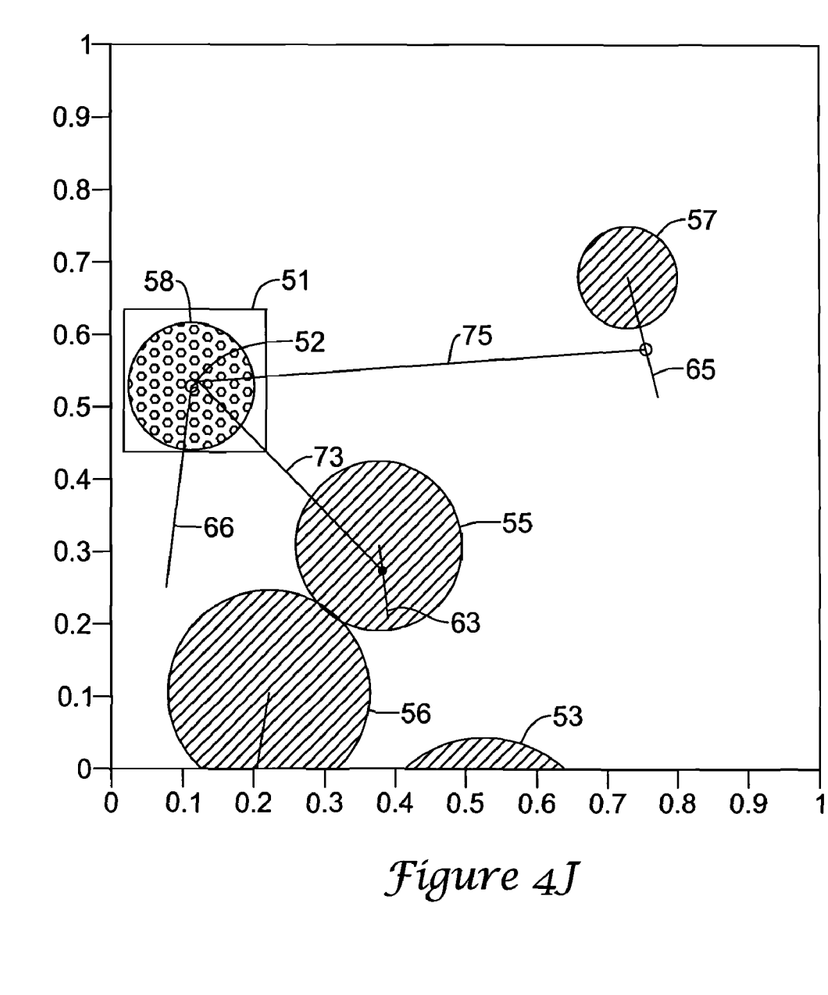

FIG. 4g shows face 56 becoming an already captured face as indicated by the dots replaced with lines. Another face 58 emerges with its velocity indicator line 66 and the PTZ intercept path 76. A determination of the face having the least cost may be made between two not previously seen faces 57 and 58. Face 57 appears to be the one having the least cost, as indicated by the dots. NFOV 51 may move towards face 57 until the PTZ center 52 becomes aligned with the center of face 57, as shown in FIG. 4h, for capture by camera 22. Thereafter, in FIG. 4i, face 57 may be indicated as already seen with the dots switched to lines and NFOV 51 may move toward the only remaining unseen face 58 which by default has the least cost. Faces 53 and 54 are beginning to move out of the WFOV of camera 21. The PTZ center 52 eventually aligns with the center of face 58 as shown in FIG. 4j for viewing or capture. The approach may continue on for new faces entering the WFOV of camera 21 while faces already captured or viewed may eventually move out of the WFOV of camera 21.

The following is an example program which may be used for the target prioritizer for system 10.

```
% target_prioritizer.m
%---------------------------------------
clear all
zoom_WFOV = 1;
zoom_PTZ = 0.2;
zoom_PTZ_min = .05;
x_WFOV = [0.5; 0.5];
x_WFOV_min = x_WFOV - .5*zoom_WFOV*[1; 1];
x_WFOV_max = x_WFOV + .5*zoom_WFOV*[1; 1];
x_PTZ = [0.5; 0.5];
x_PTZ_min = x_PTZ - .5*zoom_PTZ*[1; 1];
x_PTZ_max = x_PTZ + .5*zoom_PTZ*[1; 1];
n = 6; % number of targets
x_targets = [x_WFOV(1)*ones(1,n) + 0.3*(2*rand(1,n) - ones(1,n));
            x_WFOV(2)*ones(1,n) + rand(1,n) ];
v_targets = [.05*(2*rand(1,n) - ones(1,n));
            -.3*rand(1,n) ];
face_diam = 0.06 + 0.25*(x_WFOV_max(2) - x_targets(2,:));
zoom_targets = 1.4*face_diam;
num_good_captures = zeros(1,n);
```

```
max_num_good_captures = 6;
capture_distance = 0.02;
d_theta = 0.03; % radians
theta = [0:d_theta:d_theta+2*pi];
speed_PT = 1; % speed_PT = 1    means covers whole frame in 1 second
speed_zoom = 0.3;
J = [0 -1;
    1 0]; % for cross product in R^2
intercept_x = zeros(2,n); % location of intercept of PTZ with target(i)
intercept_v = zeros(2,n); % PTZ velocity needed to intercept target(i)
intercept_time = zeros(1,n); % time needed for PTZ to intercept target(i)
cost = zeros(1,n);
%--------------------------------------------
% Set up movie
make_movie = 1;
% http://www.mathworks.com/support/tech-notes/1200/1204.html#Section%2011
%fig = figure('units','normalized','outerposition',[0 0 1 1]); % full screen
fig = figure('units','normalized','outerposition',[0.02 0.05 .75 .95]); % 90% screen
set(fig,'DoubleBuffer','on');
set(fig,'NextPlot','replace','Visible','off');
set(fig,'Renderer','opengl')
%make_movie=input('Enter 1 to make movie, 0 for no movie:')
if(make_movie==1)
  mov=avifile('target_prioritizer.avi','compression','Cinepak', 'fp',2, 'quality',75);
end
%-----------------------------
dt = 0.02; % second;
T_max = 4; % seconds
sim_time_vec = [0 : dt : T_max];
for i_time = 1:length(sim_time_vec)
    %-----------------
    % Compute cost
    Facepower = 1;
        for i = 1:n
        %t_zoom = abs(zoom_targets(i) - zoom_PTZ)/speed_zoom;
        w = ( x_targets(:,i) - x_PTZ ) / norm( x_targets(:,i) - x_PTZ );
        c = sqrt( speed_PT^2 - (v_targets(:,i)'*J*w)^2 );
        intercept_v(:,i) = (J*w)*(J*w)'*v_targets(:,i) + c*w;
        intercept_time(i) = norm(x_targets(:,i) - x_PTZ)/norm(v_targets(:,i) - intercept_v(:,i));
        intercept_x(:,i) = x_targets(:,i) + v_targets(:,i)*intercept_time(i);
        %
        % Make logical variables
        face_in_WFOV = (x_targets(1,i)>x_WFOV_min(1) & x_targets(1,i)<x_WFOV_max(1) &
x_targets(2,i)>x_WFOV_min(2) & x_targets(2,i)<x_WFOV_max(2) );
        intercept_in_WFOV = (intercept_x(1,i)>x_WFOV_min(1) &
intercept_x(1,i)<x_WFOV_max(1) & intercept_x(2,i)>x_WFOV_min(2) &
intercept_x(2,i)<x_WFOV_max(2) );
        if(face_in_WFOV & intercept_in_WFOV)
            cost(i) = intercept_time(i)/( face_diam(i).^ facepower) ;
        else
            cost(i) = inf;
        end
            end
        %---------------------
        % See if close to some face, if so, update num_good_captures
            for i = 1:n
            if( norm(x_PTZ - x_targets(:,i))<capture_distance & norm(zoom_targets(i) -
zoom_PTZ)<5*speed_zoom*dt )
            num_good_captures(i) = num_good_captures(i) + 1;
        end
        %
        if(num_good_captures(i) > max_num_good_captures)
            cost(i) = inf;
        end
end
        [min_cost, min_index] = min(cost);
%-----------------
% update positions
if(min_cost < 1e9)
    v_PTZ = intercept_v(:,min_index);
else
    v_PTZ = [0;0];
end
if(norm(x_PTZ - x_targets(:,min_index)) > capture_distance)
    % pan-tilt
    x_PTZ = x_PTZ + v_PTZ*dt;
else
    % zoom
```

```
    zoom_PTZ = max( zoom_PTZ_min, zoom_PTZ +
speed_zoom*dt*sign(zoom_targets(min_index) − zoom_PTZ) );
   end
   x_targets = x_targets + v_targets*dt;
   face_diam = 0.06 + 0.25*(x_WFOV_max(2) − x_targets(2,:));
   zoom_targets = 1.6*face_diam;
   x_PTZ_min = x_PTZ − .5*zoom_PTZ*[1; 1];
   x_PTZ_max = x_PTZ + .5*zoom_PTZ*[1; 1];
   %---------------------
   % Display results
      clf
      hold on
      for i = 1:n
    if(i == min_index)
       fill(x_targets(1,i)*ones(size(theta))+.5*face_diam(i)*cos(theta),
x_targets(2,i)*ones(size(theta))+.5*face_diam(i)*sin(theta), 'c')
     else
       if(num_good_captures(i) > max_num_good_captures)
         fill(x_targets(1,i)*ones(size(theta))+.5*face_diam(i)*cos(theta),
x_targets(2,i)*ones(size(theta))+.5*face_diam(i)*sin(theta), 'g')
       else
         fill(x_targets(1,i)*ones(size(theta))+.5*face_diam(i)*cos(theta),
x_targets(2,i)*ones(size(theta))+.5*face_diam(i)*sin(theta), 'y')
       end
     end
     plot([x_targets(1,i),x_targets(1,i)+v_targets(1,i)],
[x_targets(2,i),x_targets(2,i)+v_targets(2,i)], 'b')
     %----
     face_in_WFOV = (x_targets(1,i)>x_WFOV_min(1) & x_targets(1,i)<x_WFOV_max(1) &
x_targets(2,i)>x_WFOV_min(2) & x_targets(2,i)<x_WFOV_max(2) );
     intercept_in_WFOV = (intercept_x(1,i)>x_WFOV_min(1) &
intercept_x(1,i)<x_WFOV_max(1) & intercept_x(2,i)>x_WFOV_min(2) &
intercept_x(2,i)<x_WFOV_max(2) );
     if(face_in_WFOV & intercept_in_WFOV)
       plot([x_PTZ(1),intercept_x(1,i)], [x_PTZ(2),intercept_x(2,i)], 'r')
     end
     %----
      end
      text(x_PTZ(1), x_PTZ(2), 'PTZ')
plot(.999*[x_WFOV_min(1),x_WFOV_max(1),x_WFOV_max(1),x_WFOV_min(1),
x_WFOV_min(1)],.999*[x_WFOV_min(2),x_WFOV_min(2),x_WFOV_max(2),
x_WFOV_max(2),x_WFOV_min(2)],'k')
plot([x_PTZ_min(1),x_PTZ_max(1),x_PTZ_max(1),x_PTZ_min(1),x_PTZ_min(1)],
[x_PTZ_min(2),x_PTZ_min(2),x_PTZ_max(2),x_PTZ_max(2),x_PTZ_min(2)],'m')
      plot(intercept_x(1,:), intercept_x(2,:), 'ko')
   axis equal
      axis([x_WFOV_min(1),x_WFOV_max(1), x_WFOV_min(2),x_WFOV_max(2)])
      text_1 = ['WFOV image: Cyan face has least cost, yellow faces have higher cost, green
faces already seen.'];
      text_2 = ['Blue rays give face velocities. Red path from PTZ to intercept for each face.'];
      title([text_1, sprintf('\n'), text_2], 'FontSize', 14)
   % xlabel(['time = ',num2str(sim_time_vec(i_time), 2),' seconds'])
   drawnow
   %pause(0.1)
   if(make_movie)
     M=getframe(fig);
     mov=addframe(mov,M);
   end
end; % end of "i_time"
if(make_movie)
  mov=close(mov); % writes avi file to directory
  eval(['print −f',int2str(fig),' −dbitmap prioritizer_',int2str(n),'_targets.bmp'])
end
% aviinfo('cone_intersections.avi')
```

In the present specification, some of the matter may be of a hypothetical or prophetic nature although stated in another manner or tense.

Although the invention has been described with respect to at least one illustrative example, many variations and modifications will become apparent to those skilled in the art upon reading the present specification. It is therefore the intention that the appended claims be interpreted as broadly as possible in view of the prior art to include all such variations and modifications.

What is claimed is:

1. A face acquisition system comprising:
a processor comprising a target prioritizer;
a wide field of view acquisition mechanism connected to the processor; and
a narrow field of view acquisition mechanism connected to the processor;
wherein the wide field of view acquisition mechanism is for observing a plurality of faces of people; and
wherein the target prioritizer is for prioritizing the plurality of faces as to which face should be captured on image in a numerical order.

2. The system of claim 1, wherein the narrow field of view acquisition mechanism is a pan/tilt/zoom acquisition mechanism.

3. The system of claim 1, wherein:
a position and velocity of a face of the plurality of faces is determined;
a position and pan/tilt speed of the narrow field of view acquisition mechanism is determined;
the position and velocity of each face and the pan/tilt speed of the narrow field of view acquisition mechanism is for determining time needed to pan/tilt the narrow field of view acquisition mechanism to the face; and
a size of the face is determined.

4. The system of claim 3, wherein:
the target prioritizer is for calculating a cost associated with a face; and
faces are prioritized according to cost.

5. The system of claim 4, wherein cost is calculated according to the time needed to pan/tilt the narrow field of view acquisition mechanism to intercept the face for capture, divided by a function related to the size of the face.

6. The system of claim 5, wherein the function related to the size of the face is a width of the face.

7. The system of claim 6, wherein a face having a lowest cost is the first face to be acquired, a face having a second lowest cost is the second face to be acquired, and so on.

8. The system of claim 7, wherein faces are further prioritized according to face pose, lighting, number of good images already taken of the face, and so forth.

9. The system of claim 5, wherein:
a way to pan/tilt a face is for the narrow field of view acquisition mechanism to pan/tilt to a predicted intercept point; and
the predicted intercept point is calculated from a current position and velocity of the face and a current position and maximum speed of the narrow field of view acquisition mechanism.

10. A method for tracking faces, comprising:
observing a plurality of people with a wide field of view acquisition mechanism;
prioritizing faces of the plurality of people according to cost;
capturing a first face with having a least cost with a narrow field of view acquisition mechanism; and
capturing a second face having the least cost after capturing the first face; and
wherein:
when a face is captured, that face is removed from the faces of the plurality of people, to be prioritized;
cost of a face is the cost of capturing the face.

11. The method of claim 10, wherein the cost is equivalent to time for the narrow field of view acquisition mechanism to intercept a face for capturing the face divided by a function related to a size of the face.

12. The method of claim 11, wherein the narrow field of view acquisition mechanism is a pan/tilt/zoom acquisition mechanism.

13. The method of claim 11, wherein the prioritizing of faces is furthered according to pose and illumination of a face, and a number of acquired images of the face being less than a required number of images.

14. The method of claim 11, wherein the time to intercept a face is based on current position and velocity of the face and the current position and velocity of the narrow field of view acquisition mechanism.

15. The method of claim 14, wherein:
the current position and velocity of the narrow field of view acquisition mechanism is of the focal point of the narrow field of view acquisition mechanism; and
the position and velocity of the narrow field of view acquisition mechanism is effected by a pan and tilt of the narrow field of view acquisition mechanism.

16. A system for capturing faces, comprising:
a wide field of view acquisition mechanism;
a pan/tilt narrow field of view acquisition mechanism; and
a processor for prioritizing faces for capture, connected to the wide field of view acquisition mechanism and the pan/tilt narrow field of view acquisition mechanism:
wherein prioritizing faces for capture is based on a cost of acquisition for an image of a face having a standard resolution.

17. The system of claim 16, wherein the cost of acquisition is proportional to an amount of time for the pan/tilt narrow field of view acquisition mechanism to pan/tilt to a face for acquisition, divided by face size as it appears on an image sensor of the narrow field of view acquisition mechanism.

18. The system of claim 17, wherein:
the pan/tilt narrow field of view acquisition mechanism comprises an optical zoom for increasing or decreasing the face size so as to obtain a desired size for an image of the face; and
the desired size of the face is calculated based on the existing face size in the wide field of view, the current zoom level in the wide field of view, and the optical characteristics of the wide and narrow field of view acquisition mechanisms.

19. The system of claim 16, wherein the prioritizing faces for capture is based upon at least one more criterion in addition to cost of acquisition.

* * * * *